(12) United States Patent
Choi et al.

(10) Patent No.: US 7,613,103 B2
(45) Date of Patent: Nov. 3, 2009

(54) APPARATUS AND METHOD FOR DECODING TURBO TCM USING COSET MAPPING

(75) Inventors: Eun-A Choi, Daejon (KR); Nae-Soo Kim, Daejon (KR); Ji-Won Jung, Busan (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 769 days.

(21) Appl. No.: 10/934,000

(22) Filed: Sep. 3, 2004

(65) Prior Publication Data

US 2005/0141409 A1   Jun. 30, 2005

(30) Foreign Application Priority Data

Dec. 27, 2003   (KR) .................. 10-2003-0098282

(51) Int. Cl.
*H04J 11/00* (2006.01)
(52) U.S. Cl. ...................................... 370/207
(58) Field of Classification Search ......... 370/206–207; 375/265, 314; 714/792
See application file for complete search history.

(56) References Cited

U.S. PATENT DOCUMENTS

| | | | | |
|---|---|---|---|---|
| 5,398,260 | A * | 3/1995 | Min ........................... | 375/286 |
| 6,304,614 | B1 | 10/2001 | Abbaszadeh | |
| 6,683,921 | B1 * | 1/2004 | Shiraishi et al. ............. | 375/331 |
| 6,714,596 | B1 * | 3/2004 | Shiraishi et al. ............. | 375/265 |
| 7,340,002 | B2 * | 3/2008 | Choi et al. .................. | 375/262 |

OTHER PUBLICATIONS

Benedetto, S.; Mondin, M.; Montorsi, G.; "Performance evaluation of trellis-coded modulation schemes"; Proceedings of the IEEE; vol. 82, Issue 6, Jun. 1994, pp. 833-855.*
Lee-Fang Wei; "Trellis-coded modulation with multidimensional constellations"; Information Theory, IEEE Transactions on vol. 33, Issue 4, Jul 1987, pp. 483-501.*
Divsalar, D.; Simon, M.K.; "Multiple trellis coded modulation (MTCM)"; Communications, IEEE Transactions on vol. 36, Issue 4, Apr. 1988, pp. 410-419.*
Zhaohui Cai, et al., "Joint trellis-coded quantisation/modulation", Electronics Letters Aug. 17, 2000 vol. 36 No. 17.
Ji-Won Jung, et al. "Turbo-Coded Pragmatic Trellis Coded Modulation Using Coset Mapping", The 14th IEEE 2003 International Symposium on Personal, Indoor and Mobile Radio Communication Proceedings, Sep. 7-10, 2003.
Michael D. Ross et al., "Fragmatic Trellis Coded Modulation: A Simulation Using 24-Sector Quantized 8-PSK" (IPCCC '92), pp. 232-239, 1992 IEEE.

* cited by examiner

*Primary Examiner*—Thai D Hoang
(74) *Attorney, Agent, or Firm*—Blakely, Sokoloff, Taylor & Zafman LLP

(57) ABSTRACT

A turbo TCM decoder for performing a soft decision without performing a sector phase quantization is disclosed. The turbo TCM decoder includes: a symbol transformer for converting a received signal to signal bits of QPSK mode by using an I-axis coordinate and a Q-axis coordinate on a constellation of the received signal; a phase sector quantizer for performing a phase sector quantization or the received signal by using the I-axis coordinate and the Q-axis coordinate; a first decoder for determining coded data by decoding the converted signal bits; a delay for delaying the quantized signal; and a second decoder for determining un-coded data by using the delayed quantized signal and the determined coded data.

5 Claims, 6 Drawing Sheets

APPARATUS AND METHOD FOR DECODING TURBO TCM USING COSET MAPPING

FIELD OF THE INVENTION

The present invention relates to a turbo Trellis Code Modulation (TCM) decoder; and, more particularly, to a turbo TCM decoder for decoding turbo-coded data by converting a received signal to signal bits of a quadrature phase shift keying (QPSK) mode by using a coset mapping.

DESCRIPTION OF RELATED ARTS

There have been various modes introduced for modulation such as a binary phase shift keying (BPSK) mode, a quadrature phase shifting keying (QPSK) mode, and an 8 phase shift keying (8PSK) mode.

In a case of a BPSK-mode modulator or a QPSK mode modulator with a convolution coding, a viterbi decoder is used.

In a case of an 8-PSK mode modulator with a trellis coding (TC), a pragmatic decoder of a TC-8PSK mode is used. The pragmatic decoder is used for using the viterbi decoder in order to utilize the BPSK mode and the QPSK mode.

Recently, a turbo coding method is widely used since the turbo coding method provides better performance comparing to use of a convolution coding method. For using the turbo coding method in the BPSK mode and the QPSK mode, the turbo decoder is used as like as using the convolution coding. However, for using the turbo coding in the 8-BPSK mode, it requires new designed decoder which has a complicated structure comparing to the turbo decoder. Therefore, if an adaptive modulator/de-modulator (MODEM) using the turbo coding for BPSK/QPSK/8PSK modes is designed, a structure of the adaptive MODEM would be very complicated and a size of the adaptive MODEM would be very large.

For overcoming the above mentioned problem, a turbo coded pragmatic TCM coding is implemented to an adaptive modulator/de-modulator (MODEM) for the BPSK/QPSK/8-PSK modes. By using the turbo coded pragmatic TCM coding, the turbo decoder can be implemented into the adaptive MODEM for the BPSK/QPSK/8-PSK modes and also, the size of the adaptive MODEM can be reduced.

FIG. 1 is a diagram illustrating a conventional adaptive MODEM using an 8-PSK modulation mode and a TC-8PSK pragmatic TCM demodulation mode.

For the 8-PSK modulation, a turbo coder 100 generates 3 bits of turbo-coded data including 2 bits of coded data and 1 bit of un-coded data as a most significant bit (MSB) by encoding 2 bits of received data in the turbo coding.

The turbo-coded data is modulated as an 8-PSK modulated signal by mapping onto 8-PSK signal points on a constellation based on 8-PSK modulation mode.

The 8-PSK modulated signal is passed through a Gaussian white noise channel and inputted to a TC-8PSK pragmatic TCM decoder 110. The 8-PSK modulated signal with a white noise are demodulated and decoded at the TC-8PSK pragmatic TCM demodulator.

For decoding a turbo-coded TCM code by using the turbo decoder 110, the 8-PSK modulated signal is converted into a QPSK signal and the QPSK signal is quantized. That is, 2-bits of the 8-PSK modulated signal is quantized into an I-channel signal and a Q-channel signal since the 2-bits of 8-PSK modulated signal are encoded by the turbo coder among the 3 bits of the 8-PSK modulated signal.

When quantizing the 8-PSK modulated signal, a soft decision value is determined after determining the number soft decision bits of the phase sector quantizer (PSQ) 130.

The number of sectors is following equation as:

$$\text{the number of sections} \leq 8 \times (2^n - 1) \qquad \text{Eq. 1}$$

In Eq. 1, an n is the number of bits, $(2^n-1)$ is the number a soft decision levels. The number of sections is computed by multiplying the number of soft decision levels by 8.

Based on Eq. 1, a point of received 8-PSK modulated signal on the constellation is detected by using the PSQ 130 and the received 8-PSK modulated signal is converted into the I-channel signal and the Q-channel signal for a turbo decoder 160 by using a soft decision unit 120. The turbo decoder 160 decodes 3 bits of soft decision signal into 1 bit of turbo decoded data.

For determining a soft decision location and I/Q values, the SPQ 130 compares I-channel value and Q-channel value based on the received 8-PSK modulated signal and determines 8 locations on a constellation. Based on the determined 8 locations, the soft decision is performed with the received 8-PSK modulated signal based on the I/Q values. If a standard value of soft decision level is determined, all locations are in between 0 and 1, which are absolute values of the I/Q values and a distance between levels is 0.1429 when the quantization is performed into 56 sectors.

Furthermore, a LUT 150 decode 1-bit of the 8-PSK modulated signal, which is not coded by the turbo coder by using an I-channel coordinate value and a Q-channel coordinate value of the 8-PSK modulated signal. That is, the LUT 150 decodes 1-bit of the 8-PSK modulated signal by using phase information outputted from the PSQ 130. The phase information is delayed by a delay 140 for waiting to decode the 2-bits of the 8-PSK modulated signal at the turbo decoder 160 and then inputted into the LUT 150.

In the TC-8PSK pragmatic TCM demodulation mode, a soft decision bit is required to generate for decoding 2-bit of the 8-PSK modulated signal decoded by the turbo coder and the soft decision unit 120 requires the phase information about locations of 8-PSK modulated signal on the constellation which is outputted from the PSQ 130. Therefore, the sector phase quantizer 130 is required.

A conventional turbo code is a code closest to a Shanon limitation which is theoretically most effective code. However, a turbo decoder must be designed according to a modulation type such as BPSK, QPSK, 8PSK and 16QAM. Therefore, the turbo decoder has a totally different structure according to the modulation type. Accordingly, using the turbo decoder in an adaptive modulation/demodulation (MODEM) may increase a size of a hardware having the turbo decoder and a complexity of a circuitry of the turbo decoder. Therefore, there have been demanded a turbo decoded pragmatic trellis coded modulation decoder can be used for various modulation modes without changing it's structure.

Furthermore, in a conventional turbo coded pragmatic trellis coded modulation mode, the soft decision is performed in a range of amplitude values of the I-channel and the Q-channel, 0 to 0.707. Accordingly, a Euclidian distance is very short. Therefore, the Euclidian distance needs to be increase for improving a performance.

SUMMARY OF THE INVENTION

It is, therefore, an object of the present invention to provide a turbo trellis coded modulation (TCM) decoder for converting a received signal to signal bits of quadrature phase shift keying (QPSK) mode by using coset mapping and a method thereof.

It is another object of the present invention to provide a turbo trellis coded modulation (TCM) decoder used in an adaptive modulation/demodulation (MODEM) without changing it's structure according to a modulation type by converting a received signal to signal bits of quadrature phase shift keying (QPSK) mode.

In accordance with an aspect of the present invention, there is provided a turbo TCM decoder, including: a symbol transformer for converting a received signal to signal bits of QPSK mode by using an I-axis coordinate and a Q-axis coordinate on a constellation of the received signal; a phase sector quantizor for performing a phase sector quantization on the received signal by using the I-axis coordinate and the Q-axis coordinate; a coded data determiner for determining coded data by decoding the signal bits of QPSK mode; a delay for delaying the quantized signal from the phase sector quantization means; and a un-coded data determiner for determining un-coded data by using the delayed quantized signal and the determined coded data.

In accordance with an aspect of the present invention, there is also provided a method for a turbo TCM decoding using a coset mapping, the method including the steps of: a) converting a received signal to signal bits of quadrature phase shift keying (QPSK) mode by using an I-axis coordinate and a Q-axis coordinate on a constellation of the received signal; b) determining coded data by decoding the converted signal bits of QPSK mode; c) performing a phase sector quantization on the received signal by using the I-axis coordinate and the Q-axis coordinate; d) delaying the quantized signal; and e) determining un-coded data by using the delayed quantized signal and the determined coded data.

BRIEF DESCRIPTION OF THE DRAWINGS

The above and other objects and features of the present invention will become better understood with regard to the following description of the preferred embodiments given in conjunction with the accompanying drawings, in which.

DETAILED DESCRIPTION OF THE INVENTION

Hereinafter, a turbo TCM decoder by using coset mapping in accordance with a preferred embodiment of the present invention will be described in detail with reference to the accompanying drawings.

Figure 2:
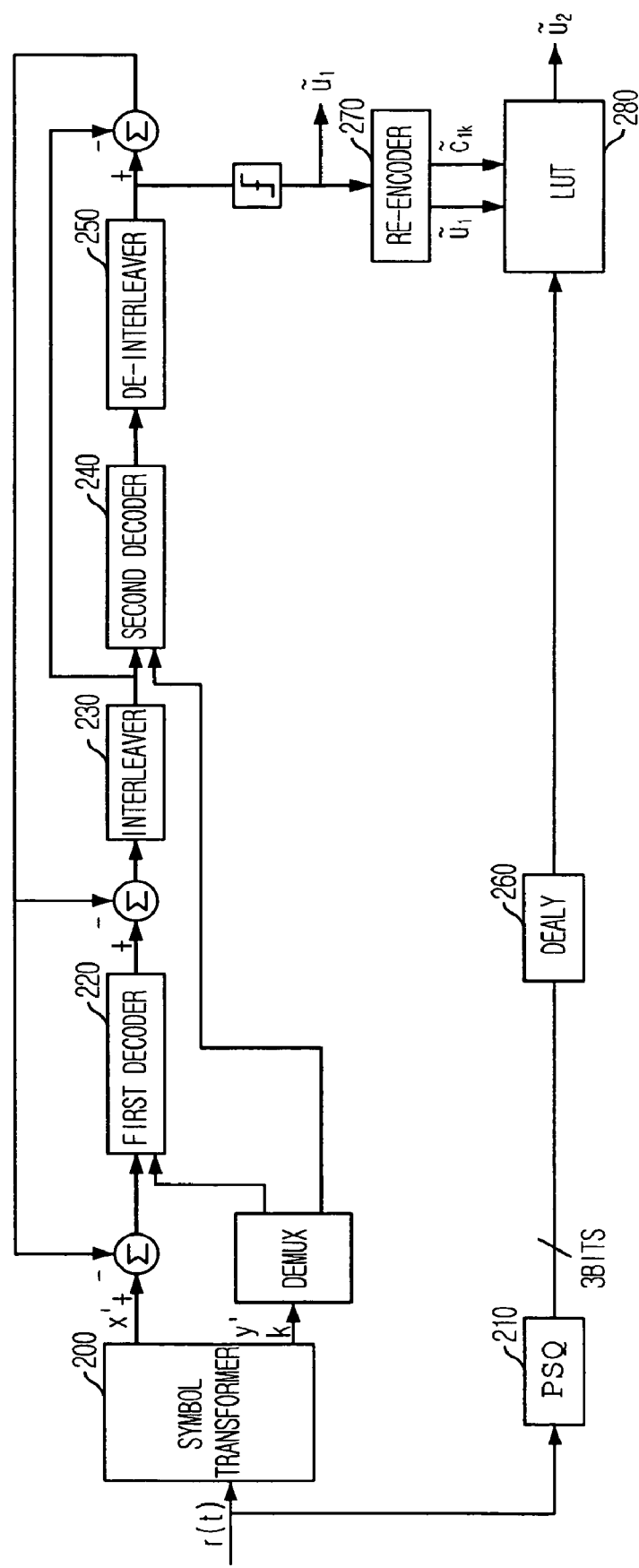
FIG. 2 is a diagram illustrating a turbo trellis code modulation (TCM) decoder in accordance with a preferred embodiment of the present invention.

FIG. 2 is a diagram illustrating a turbo trellis code modulation (TCM) decoder in accordance with a preferred embodiment of the present invention.

Figure 1:
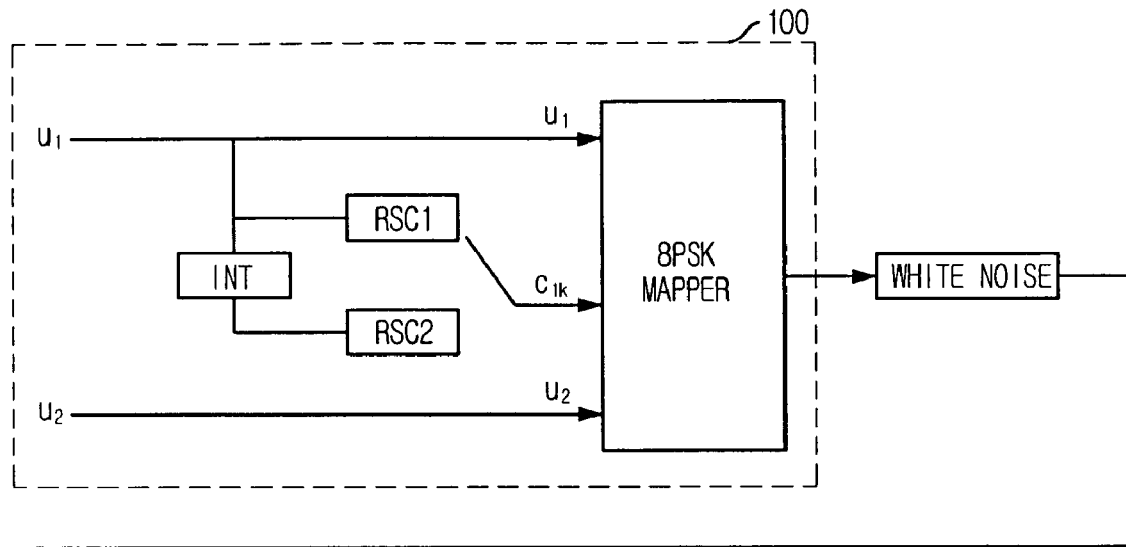
FIG. 1 is a diagram illustrating a conventional adaptive MODEM using a 8-PSK modulation mode and a TC-8PSK pragmatic TCM demodulation mode.
Figure 1:
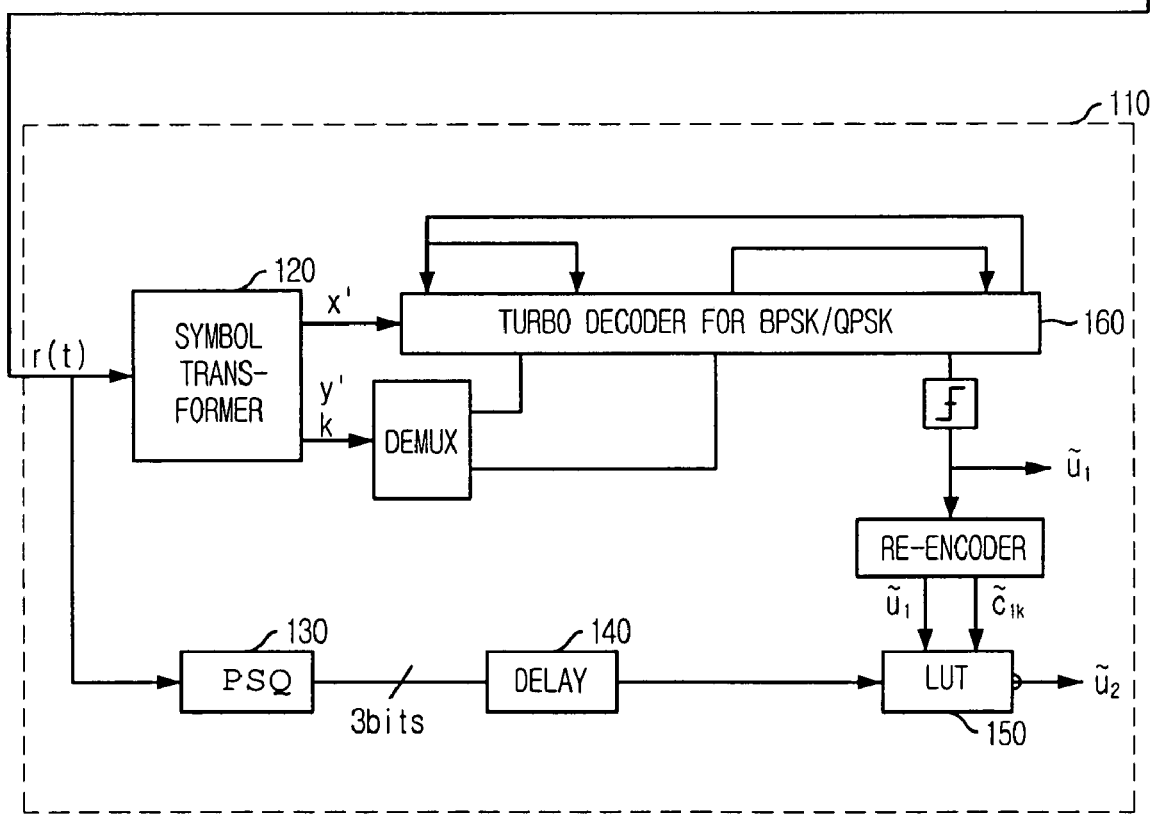

The turbo TCM decoder decodes a signal coded by the turbo coder 100 in FIG. 1.

As shown in FIG. 2, the turbo TCM decoder includes a symbol transformer 200, a phase sector quantizer (PSQ) 210, a first decoder 220, an interleaver 230, a second decoder 240, a de-interleaver 250, a delay 260, a re-encoder 270 and a LUT 280.

The symbol transformer 200 obtains an I-axis coordinates value x and a Q-axis coordinate value y and converts a received 8-PSK modulated signal to signal bits of a QPSK mode by using the obtained I-axis coordinates value x and the obtained Q-axis coordinate value y on a constellation of the received 8-PSK symbols.

Hereinafter, detailed operations of the symbol transformer 200 are explained.

The symbol transformer 200 obtains an amplitude r and a phase φ of a received 8-PSK modulated signal by using following equation:

$$r=\sqrt{x^2+y^2}, \phi=\tan^{-1}(y/x) \qquad \text{Eq. 2}$$

In Eq. 2, r is an amplitude, φ is phase, x is the I-axis coordinates value and y is the Q-axis coordinate value.

For obtaining input symbol x' and y' in order to convert signal bits of the M-PSK mode to the signal bits of the QPSK mode, the I-axis coordinate value x and the Q-axis coordinate value y are used. A relation between the (x', y') and (x, y) is a rotational transformation and defied by following equation:

$$x'=\sqrt{2}\cos(2(\phi-\varphi))$$

$$y'=\sqrt{2}\sin(2(\phi-\varphi)) \qquad \text{Eq. 3}$$

The PSQ 210 performs a phase sector quantization of the received 8-PSK modulated signal by using coordinates value of I-axis and Q-axis on the constellation of the received 8-PSK modulated signal.

The first decoder 220, the second decoder 240, the interleaver 230 and the de-interleaver 250 decode receive data from the symbol transformer 200.

The re-encoder 270 encodes output data from the de-interleaver 250 for obtaining an un-coded bit which is not coded.

The delay 260 delays output of the PSQ 210 until the re-encoder 270 generates re-encoded bit for obtaining un-coded bit.

The LUT 280 generates un-coded data by using output values of the PSQ 210 and the re-encoded bit from the re-encoder 270.

Figure 3:
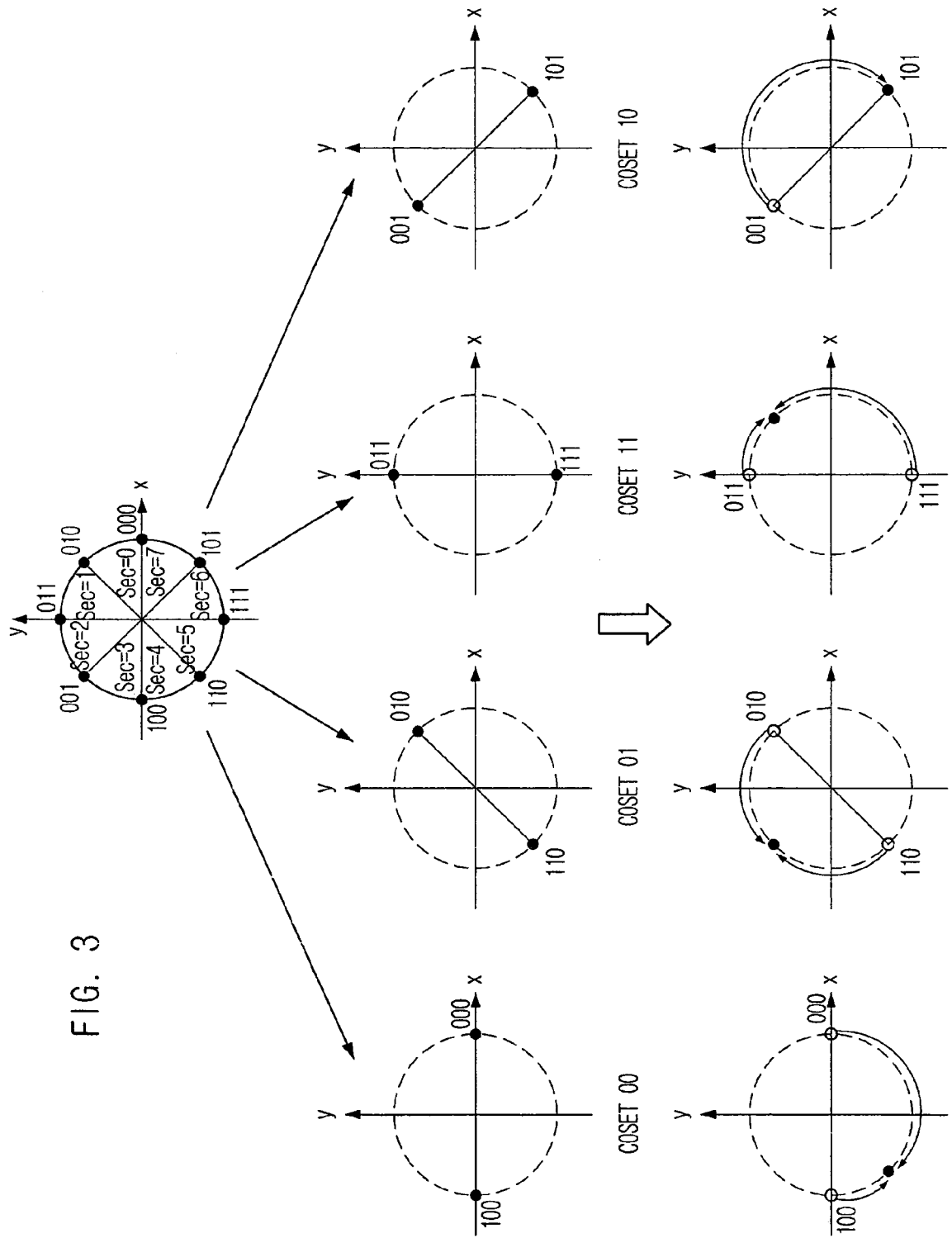
FIGS. 3 and 4 shows constellations of x' and y' in case phases of a 8-PSK modulated signal are φ=5π/8 and φ=π/2.
Figure 4:
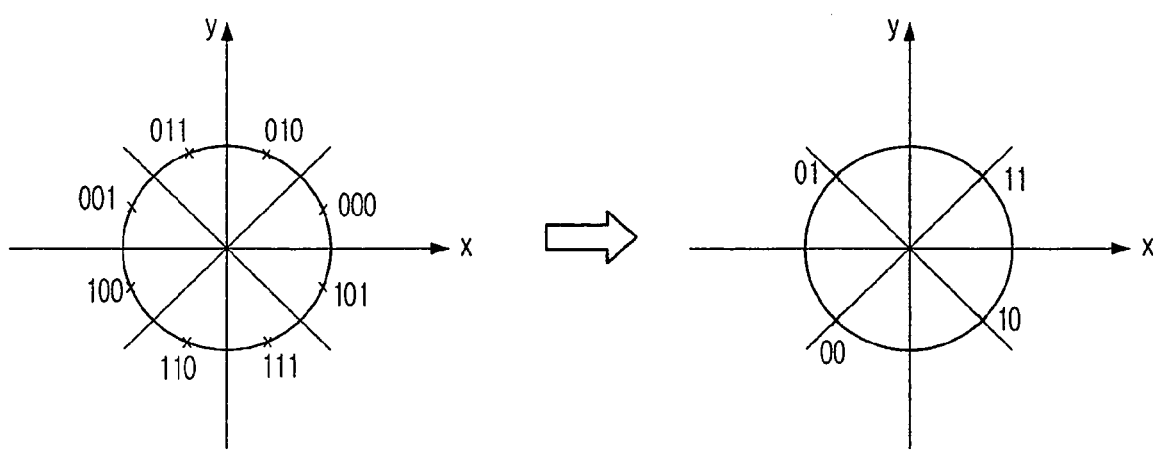

FIGS. 3 and 4 shows constellations of x' and y' in case phases of a 8-PSK modulated signal are φ=5π/8 and φ=π/2.

As shown in FIG. 3, a QPSK constellation is exactly arranged in 45 degree, 135 degree, 225 degree and 315 degree. That is, by using the symbol transformer 200, conventional soft decision method, which performs the soft decision in a range of −1 to 1, can be used without modification.

Conventionally, a performance is degraded since a Euclidian distance is decreased by inputting 8-PSK symbols into a decoder in a conventional turbo-coded pragmatic TCM coding method. However, in the present invention, the symbol transformer 200 converts an input signal to the signal bits of the QPSK mode suitable to a conventional B/QPSK turbo decoder by using the coset mapping. Therefore, the Euclidian distance is not decreased and also, the performance is not degraded.

The I-axis coordinate value x and the Q-axis coordinate value Q can be used for obtaining non-coded 1 bit of the 8-PSK modulated signal and the I-axis coordinate value x and the Q-axis coordinate value Q are obtained by a method used in the conventional turbo coded pragmatic TCM decoding method.

In a mean time, there is a performance degradation about 0.8 dB in a constellation of 8-PSK signal based on 22.5 degree comparing to a constellation of 8-PSK signal based on 0 degree because of an Euclidean distance. It can be overcome by setting the phase is π/2.

Figure 5:
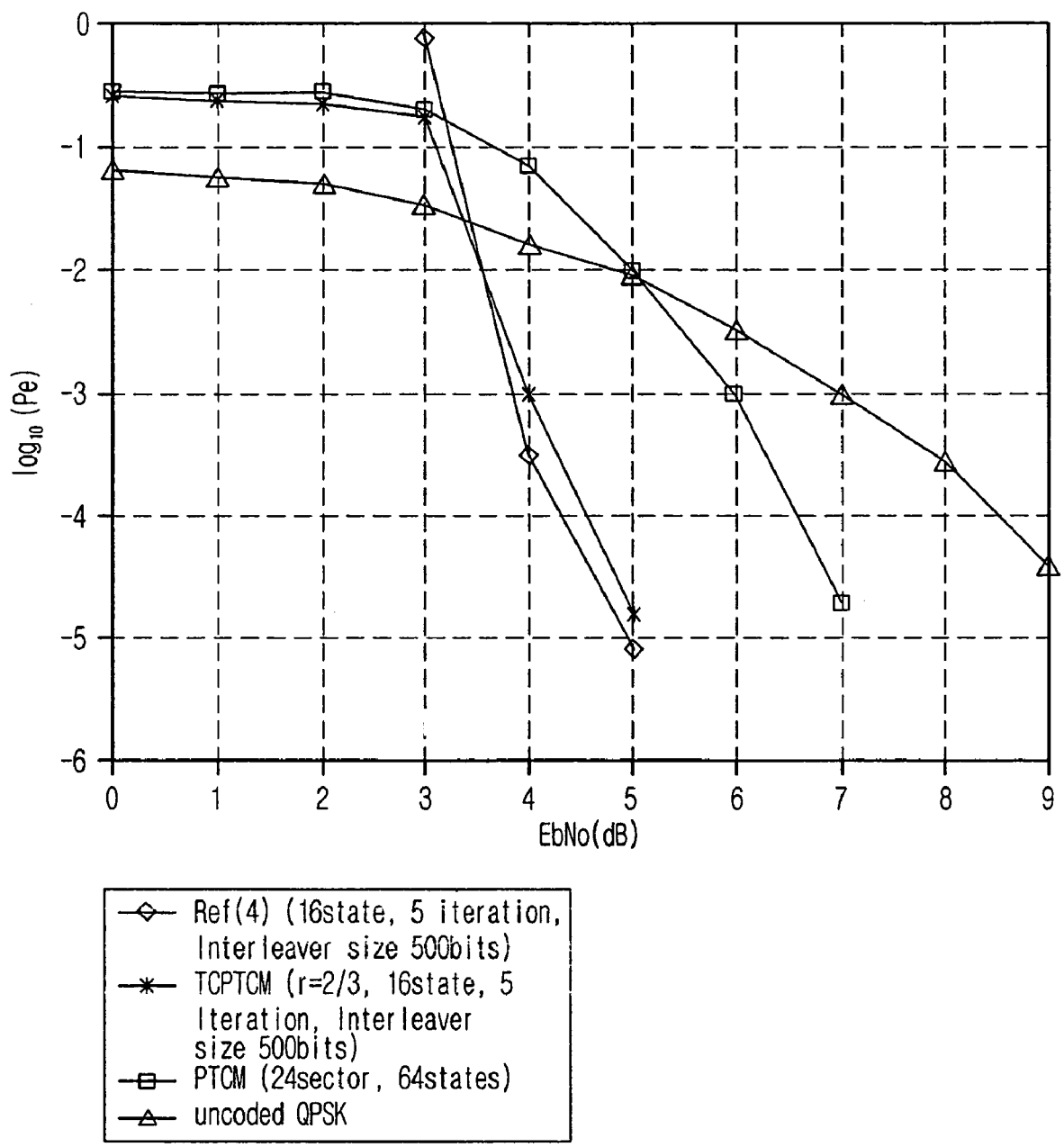
FIG. 5 is a graph showing bit error rat of a turbo TCM decoder using a coset mapping in accordance with a preferred embodiment of the present invention.

FIG. 5 is a graph showing bit error rat of a turbo TCM decoder using a coset mapping in accordance with a preferred embodiment of the present invention.

As shown, there is 1.6 dB of coding gain in accordance with the present invention.

Figure 6:
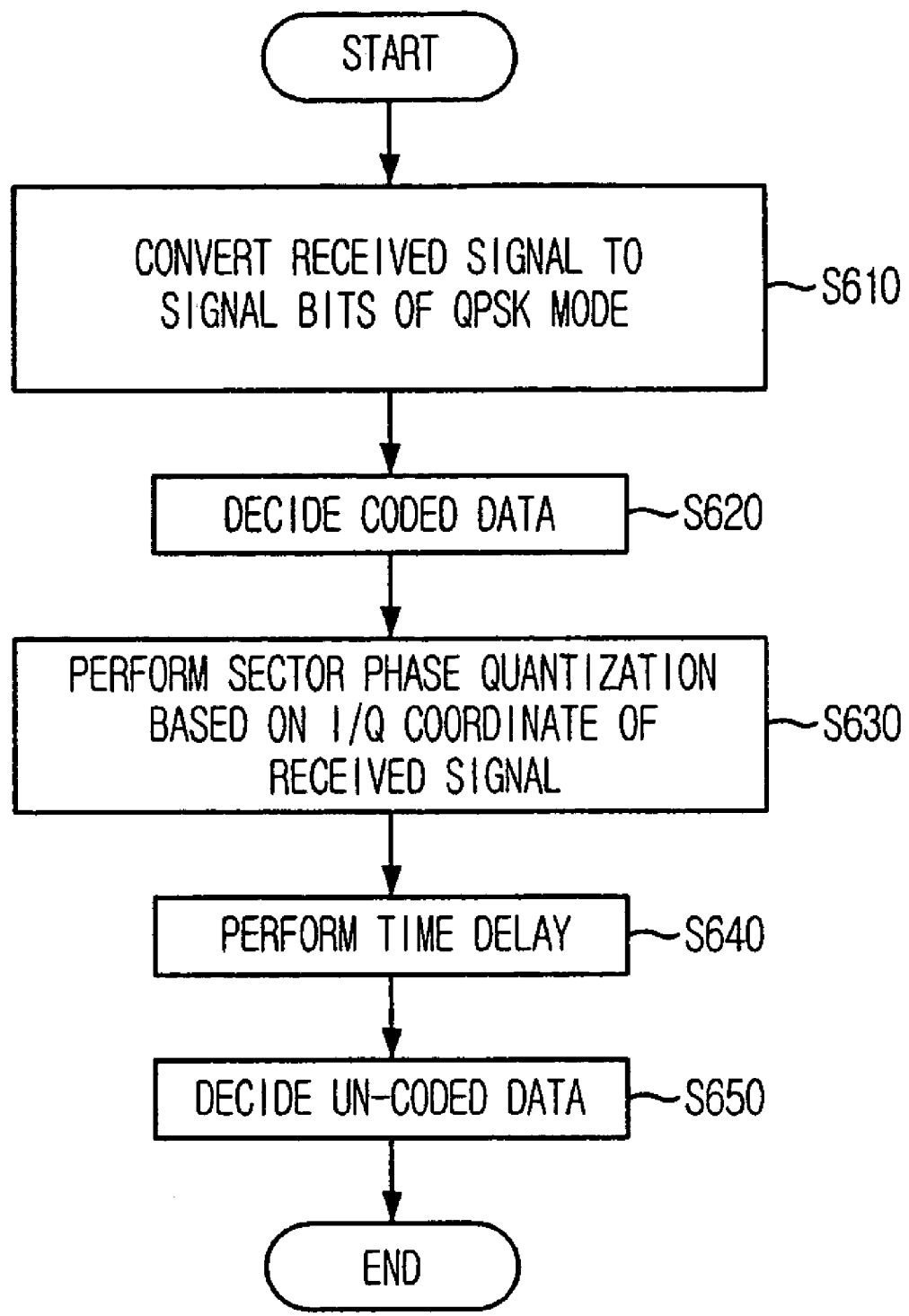
FIG. 6 is a flowchart for explaining a method of turbo TCM decoding using coset mapping in accordance with a preferred embodiment of the present invention.

FIG. 6 is a flowchart for explaining a method of turbo TCM decoding using coset mapping in accordance with a preferred embodiment of the present invention.

At step S610, a received 8-PSK signal is converted to signal bits of QPSK mode by using an I-axis coordinate value and a Q-axis coordinate value on a constellation of a received 8-PSK signal and a phase of the received 8-PSK signal.

At step S620, the converted signal bits of QPSK mode are decoded and coded data is determined.

At step S630, a phase sector quantization is performed on the received signal by using the I-axis coordinate value and the Q-axis coordinate value on a constellation of a received 8-PSK signal.

At step S640, the phase sector quantized signal is delayed until decoded bit of un-coded bit is generated for obtaining un-coded bit.

At step S650, the un-coded bit is determined by using the delayed quantized signal and the determined coded data.

The method of turbo TCM decoding using coset mapping of the present invention can be implemented as a set of instructions and the set of instructions can be stored in a computer readable recoding medium such as a CD-ROM, a RAM, a ROM, a floppy disk, a hard disk and an optical magnetic disk.

As mentioned above, the present invention can convert an input signal of M-PSK mode to signal bits of QPSK mode which is suitable for B/QPSK mode turbo-decoder by using a coset mapping and, therefore, the present invention can gain 1.6 dB of coding gain.

Also, the turbo decoder of the present invention can be used for various modulation type without changing it's structure by using the symbol transformer converting a received signal to a QPSK mode signal.

Furthermore, the present invention can eliminate a performance degradation when a constellation based on 22.5 degree is used.

Moreover, the present invention can increase an Euclidean distance by using the coset mapping of the present invention for performing the soft decision in a range of −1 to 1 of I/Q-channels amplitude values according to sections of a received 8-PSK modulated signal.

The present application contains subject matter related to Korean patent application No. KR 2003-0093207, filed in the Korean patent office on Dec. 18, 2003, the entire contents of which being incorporated herein by reference.

While the present invention has been described with respect to certain preferred embodiments, it will be apparent to those skilled in the art that various changes and modifications may be made without departing from the spirits and scope of the invention as defined in the following claims.

What is claimed is:

1. A turbo TCM decoder, comprising:
   means for converting a received signal to signal bits of QPSK mode by using an I-axis coordinate and a Q-axis coordinate on a constellation of the received signal;
   means for performing a phase sector quantization on the received signal by using the I-axis coordinate and the Q-axis coordinate;
   means for determining coded data by decoding the signal bits of QPSK mode;
   means for delaying the quantized signal from the phase sector quantization means; and
   means for determining un-coded data by using the delayed quantized signal and the determined coded data,
   wherein a relation of the I-axis coordinate and the Q-axis coordinate with a phase of the received signal is determined by a rotational transformation using the phase of the received signal,
   wherein said rotational transformation using the phase of the received signal is determined by:

$$x' = \sqrt{2}\cos(2(\phi-\varphi))$$
   $$y' = \sqrt{2}\sin(2(\phi-\varphi)),$$

wherein x' and y' are coordinates of input symbols for converting the received signal to the signal bits of QPSK mode, φ is a phase rotation constant and ϕ is a phase of the received signal, and
   wherein said means for determining the coded data by decoding the signal bits of QPSK mode includes:
   a first decoding unit configured to decode the signal bits of QPSK mode; and
   a second decoding unit configured to decode an output of the first decoding unit.

2. The turbo TCM decoder of the claim 1, wherein the received signal has a standard phase of 5π/8.

3. The turbo TCM decoder of the claim 1, wherein the received signal has a standard phase of π/2.

4. A method for a turbo TCM decoding using a coset mapping, the method comprising the steps of:
   a) converting a received signal to signal bits of quadrature phase shaft keying (QPSK) mode by using an I-axis coordinate and a Q-axis coordinate on a constellation of the received signal;
   b) determining coded data by decoding the converted signal bits of QPSK mode;
   c) performing a phase sector quantization on the received signal by using the I-axis coordinate and the Q-axis coordinate;
   d) delaying the quantized signal; and
   e) determining un-coded data by using the delayed quantized signal and the determined coded data,
   wherein a relation of the I-axis coordinate and the Q-axis coordinate with a phase of the received signal is determined by a rotational transformation using the phase of the received signal,
   wherein said rotational transformation using the phase of the received signal is determined by:

$$x' = \sqrt{2}\cos(2(\phi-\varphi))$$
   $$y' = \sqrt{2}\sin(2(\phi-\varphi)),$$

wherein x' and y' are coordinates of input symbols for converting the received signal to the signal bits of QPSK mode, φ is a phase rotation constant and ϕ is a phase of the received signal, and
   wherein the determining of the coded data includes:
   pre-decoding the signal bits of QPSK mode; and
   post-decoding the pre-decoded signal bits of QPSK mode.

5. The method of the claim 4, wherein the received signal has a standard phase of π/2.

* * * * *